United States Patent
Akiyama et al.

(10) Patent No.: US 9,593,445 B2
(45) Date of Patent: Mar. 14, 2017

(54) CORD FOR REINFORCING RUBBER, METHOD OF MANUFACTURING THE CORD, AND RUBBER PRODUCT USING THE CORD

(75) Inventors: Mitsuharu Akiyama, Tokyo (JP); Naoya Mizukoshi, St. Helens (GB); Keisuke Kajihara, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 1719 days.

(21) Appl. No.: 11/629,397

(22) PCT Filed: Jun. 24, 2005

(86) PCT No.: PCT/JP2005/011643
§ 371 (c)(1),
(2), (4) Date: Mar. 8, 2007

(87) PCT Pub. No.: WO2006/001385
PCT Pub. Date: Jan. 5, 2006

(65) Prior Publication Data
US 2008/0032130 A1    Feb. 7, 2008

(30) Foreign Application Priority Data
Jun. 28, 2004    (JP) ................................. 2004-190346

(51) Int. Cl.
*D06M 15/693*    (2006.01)
*C08J 5/06*    (2006.01)
(Continued)

(52) U.S. Cl.
CPC ............. *D06M 15/693* (2013.01); *C08J 5/06* (2013.01); *D07B 1/025* (2013.01); *D07B 1/16* (2013.01);
(Continued)

(58) Field of Classification Search
CPC ...... D06M 15/693; C08J 5/06; C08J 2321/00; D07B 1/025; D07B 1/16;
(Continued)

(56) References Cited

U.S. PATENT DOCUMENTS 3,648,452 A    3/1972    Young
3,663,268 A    5/1972    Wilson
(Continued)

FOREIGN PATENT DOCUMENTS

EP    674121    * 9/1995
EP    0 688 973    12/1995
(Continued)

*Primary Examiner* — Jeremy R Pierce
(74) *Attorney, Agent, or Firm* — Hamre, Schumann, Mueller & Larson, P.C.

(57) ABSTRACT

A reinforcing cord for rubber reinforcement of the present invention that is used for reinforcing a rubber product is provided with a plurality of strands. The strand includes bundled fibers and a coating layer formed so as to cover the bundled fibers. The plurality of strands are in tight contact with one another via the coating layer. The coating layer contains a material that is crosslinkable by thermal treatment. A method of manufacturing the reinforcing cord for rubber reinforcement includes the steps of (i) forming strands that include bundled fibers and a coating layer formed so as to cover the bundled fibers, and (ii) bringing the strands into tight contact with one another via the coating layer by twisting the strands together. The coating layer contains a material that is crosslinkable by thermal treatment.

10 Claims, 1 Drawing Sheet

(51) Int. Cl.
*D07B 1/02* (2006.01)
*D07B 1/16* (2006.01)
*F16G 1/28* (2006.01)

(52) U.S. Cl.
CPC ............ *F16G 1/28* (2013.01); *C08J 2321/00* (2013.01); *D07B 2201/2024* (2013.01); *D07B 2201/2041* (2013.01); *D07B 2201/2044* (2013.01); *D07B 2201/2045* (2013.01); *D07B 2205/205* (2013.01); *D07B 2205/2082* (2013.01); *D07B 2205/3003* (2013.01); *D07B 2205/3007* (2013.01); *D07B 2401/2025* (2013.01); *D07B 2401/2035* (2013.01); *D07B 2501/2076* (2013.01); *Y10T 428/2933* (2015.01)

(58) Field of Classification Search
CPC ...... D07B 2201/2024; D07B 2205/205; D07B 2401/2025; F16G 1/28; Y10T 428/2933
See application file for complete search history.

(56) References Cited

U.S. PATENT DOCUMENTS

| | | | |
|---|---|---|---|
| 3,862,882 A | | 1/1975 | Marzocchi |
| 4,239,800 A | | 12/1980 | Girgis |
| 4,405,746 A | | 9/1983 | Girgis |
| 4,414,272 A | * | 11/1983 | Watanabe et al. ............ 428/331 |
| 4,826,721 A | * | 5/1989 | Obrecht et al. ................ 442/71 |
| 5,017,639 A | | 5/1991 | Mori et al. |
| 5,036,122 A | * | 7/1991 | Auerbach et al. ............ 524/259 |
| 5,077,127 A | | 12/1991 | Mori et al. |
| 5,151,142 A | * | 9/1992 | Imai et al. .................... 152/565 |
| 5,378,206 A | * | 1/1995 | Mizuno et al. ............... 474/263 |
| 5,496,884 A | * | 3/1996 | Weih et al. .................... 524/503 |
| 5,609,541 A | * | 3/1997 | Tachibana et al. ........... 474/205 |
| 6,106,943 A | * | 8/2000 | Akiyama ...................... 428/375 |
| 6,132,870 A | * | 10/2000 | Halladay et al. ............. 428/373 |
| 6,616,558 B2 | * | 9/2003 | South ............................ 474/260 |
| 7,390,570 B2 | * | 6/2008 | Choi et al. .................... 428/413 |
| 8,222,328 B2 | * | 7/2012 | Akiyama et al. ............ 524/104 |
| 2004/0265586 A1 | | 12/2004 | Gonthier et al. |
| 2006/0063884 A1 | * | 3/2006 | Akiyama ...................... 524/555 |
| 2007/0082777 A1 | * | 4/2007 | Nishida et al. ............... 474/237 |
| 2010/0221520 A1 | * | 9/2010 | Tai et al. .................... 428/296.4 |

FOREIGN PATENT DOCUMENTS

| | | | |
|---|---|---|---|
| GB | 2 082 607 | | 3/1982 |
| JP | 63-126975 | | 5/1988 |
| JP | 63-135564 | | 6/1988 |
| JP | 63-270877 | | 11/1988 |
| JP | 1-272876 | | 10/1989 |
| JP | 2-221465 | | 9/1990 |
| JP | 3-269178 | | 11/1991 |
| JP | 07330957 | * | 12/1995 |
| JP | 11-241275 | | 9/1999 |
| JP | 03/000611 | | 1/2003 |
| JP | 2004183121 A | * | 7/2004 .......... D06M 15/693 |
| WO | 03/000611 | | 1/2003 |
| WO | WO 2004057099 A1 | * | 7/2004 |
| WO | WO 2008041615 A1 | * | 4/2008 |

* cited by examiner

CORD FOR REINFORCING RUBBER, METHOD OF MANUFACTURING THE CORD, AND RUBBER PRODUCT USING THE CORD

TECHNICAL FIELD

The present invention relates to a reinforcing cord for rubber reinforcement, a method of manufacturing the same, and a rubber product including the same.

BACKGROUND ART

A toothed belt used for a camshaft drive for an internal-combustion engine of an automobile is required to have high dimensional stability in order to maintain the appropriate timing. Alternately, a rubber belt used for driving an injection pump or the like, or transmitting power in an industrial machine or the like is required to have strength and elasticity that can withstand a high load and severe bending. In order to satisfy such needs, in some cases, a reinforcing cord including reinforcing fibers has been embedded in the matrix rubber of these rubber products.

In the reinforcing cords, a mixed liquid (RFL liquid) of a resorcinol-formalin condensation product and a latex generally is used for protecting surfaces of the reinforcing fibers. In this case, the RFL liquid is applied to fibers before or after a primary twist. Next, a plurality of primarily twisted fibers are bundled and then finally twisted. Furthermore, in order to improve the bonding property, another coating layer may be formed according to the kind of matrix rubber. Thus, the reinforcing cord is produced.

Various kinds of treatment agents have been studied for improving the performance of such reinforcing cord. For example, for the purposes of improving heat resistance, a cord using an RFL liquid that contains an H-NBR latex has been proposed (JP 63(1988)-270877 A). On the other hand, for the purposes of improving the bonding property with the matrix rubber, a cord whose surface is covered with a coating layer that contains a rubber component and maleimide has been proposed (JP 11(1999)-241275 A).

However, when these rubber products are subjected to bending stress repeatedly at high temperatures, or suffer penetration of water, oil, or the like, a peeling-off may occur between the reinforcing cord and the rubber matrix, or a crack may be generated inside the reinforcing cord.

Generally, in the RFL liquid applied to the primarily twisted reinforcing fibers, the reaction is almost entirely completed by thermal treatment. Therefore, the primarily twisted fibers within the reinforcing cord do not bond to one another but are merely in contact with one another. These fibers are not bonded. For this reason, when the rubber product is bent, gaps are formed among the primarily twisted fibers inside the reinforcing cord. As a result, the strength of the cord has deteriorated in some cases. The deterioration in strength becomes apparent when, in particular, water or oil penetrates into the rubber. Therefore, when the rubber product is used under severe conditions, the durability of the cord should be improved further.

DISCLOSURE OF INVENTION

Under these circumstances, an object of the present invention is to provide a reinforcing cord for rubber reinforcement capable of exhibiting resistance against water and oil and preventing deterioration of the strength of a rubber product even when used under high-temperature high-bending conditions. Furthermore, the object of the present invention is to provide a method of manufacturing the reinforcing cord and a rubber product using the same.

In order to achieve the above objects, the reinforcing cord for rubber reinforcement of the present invention is a reinforcing cord for reinforcing a rubber product, and comprises a plurality of strands, wherein the strand includes bundled fibers and a coating layer formed so as to cover the bundled fibers, the plurality of strands are in tight contact with one another via the coating layer, and the coating layer contains a material that is crosslinkable by thermal treatment.

Furthermore, a rubber product of the present invention comprises a rubber portion and a reinforcing cord for rubber reinforcement embedded in the rubber portion, wherein the reinforcing cord for rubber reinforcement is a reinforcing cord for rubber reinforcement of the present invention.

A method of the present invention that is used for manufacturing a reinforcing cord for rubber reinforcement comprises the steps of (i) forming strands that include bundled fibers and a coating layer formed so as to cover the bundled fibers; and (ii) bringing the strands into tight contact with one another via the coating layer by twisting the strands together, wherein the coating layer contains a material that is crosslinkable by thermal treatment.

In the reinforcing cord for rubber reinforcement of the present invention, the fibers in the strand are bonded and the strands are bonded, so that no gaps are formed among the fibers even when the reinforcing cord for rubber reinforcement is bent. Therefore, it is possible to obtain a reinforcing cord for rubber reinforcement that has strong resistance against water or oil, and has only a small deterioration in strength even when used under high-temperature and high-bending conditions. In the rubber product that uses the reinforcing cord for rubber reinforcement, a peeling-off between the cord and the matrix rubber of the rubber product, and a peeling-off inside the cord can be suppressed. Therefore, according to the present invention, it is possible to obtain a rubber product excellent in bending fatigue resistance, in particular, the bending fatigue resistance under the conditions that water or oil is present.

DESCRIPTION OF THE PREFERRED EMBODIMENTS

Figure 1:
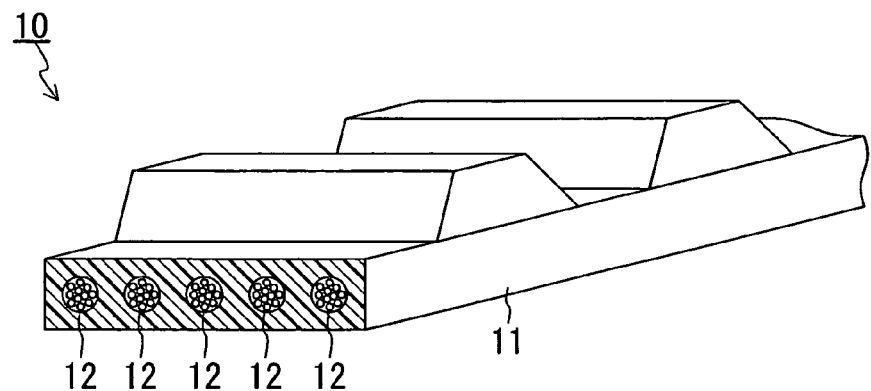
FIG. 1 is a partial exploded perspective view that schematically shows one example of a rubber product of the present invention.

Hereinafter, embodiments of the present invention will be described. It should be noted that although specific compounds may be illustrated as substances that exhibit a specific function in the below description, the present invention is not limited thereto. Furthermore, the materials illustrated in the specification may be used singly or used in combination unless otherwise specified.

Embodiment 1

In Embodiment 1, a reinforcing cord for rubber reinforcement and a method of manufacturing the same of the present invention will be described. The reinforcing cord for rubber reinforcement of the present invention is a cord for reinforcing a rubber product. The cord includes a plurality of strands. The strand includes bundled fibers and a coating layer formed so as to cover the bundled fibers. The strands are in tight contact with one another via the coating layer. The coating layer contains a material for bonding the strands. More specifically, the coating layer contains a material that is crosslinkable by thermal treatment. The bundled fibers may be primarily twisted.

As materials that are crosslinkable by thermal treatment, a material that contains rubber and a crosslinker can be used. The coating layer can be formed by applying to fiber surfaces a treatment agent that contains rubber and a crosslinker, and then drying. When the coating layer contains a crosslinkable material and the crosslinker, for example, in the case that the coating layer contains rubber and the crosslinker, the rubber is crosslinkable by thermal treatment. As a result, adjacent strands are bonded via the coating layers present on the strand surfaces. In this case, a chemical bond occurs at an interface between the coating layers.

The thermal treatment for crosslinking can be performed after the strands are brought into tight contact with one another. The thermal treatment may be performed before the reinforcing cord is embedded into the rubber product or the thermal treatment may be performed after the reinforcing cord is embedded into the rubber product. That is, the reinforcing cord of the present invention may be a cord in which the strands are bonded by thermal treatment.

Examples of rubbers contained in the coating layer include: butadiene-styrene copolymer; dicarboxylated butadiene-styrene copolymer; vinylpyridine-butadiene-styrene terpolymer; chloroprene; butadiene-rubber; chlorosulfonated polyethylene; acrylonitrile-butadiene copolymer; and H-NBR rubber. In particular, the chlorosulfonated polyethylene and the hydrogenated nitrile rubber (H-NBR rubber) have the advantage of having strong resistance against bending fatigue at high temperatures, and having high oil resistance and water resistance. In this light, the coating layer preferably contains at least one rubber selected from the group consisting of the chlorosulfonated polyethylene and the hydrogenated nitrile rubber. For example, the hydrogenated nitrile rubber preferably is used.

Quinone dioxime-based crosslinkers such as p-quinone dioxime may be used as crosslinkers (vulcanizers) contained in the coating layer. Methacrylate-based crosslinkers such as lauryl methacrylate or methyl methacrylate may also be used. In addition, allyl-based crosslinkers such as DAF (diallyl fumarate), DAP (diallyl phthalate), TAC (triallyl cyanurate), and TAIC (triallyl isocyanurate) may be used. Furthermore, maleimide-based crosslinkers (maleimide or a maleimide derivative) such as bismaleimide, phenylmaleimide, or N, N'-m-phenylenedimaleimide may be used. In addition, a diisocyanate compound (organic diisocyanate) may be used. An aromatic nitroso compound may be used. Furthermore, sulfur and other crosslinkers may be used. In particular, it is preferable to use at least one selected from the group consisting of the diisocyanate compound, the aromatic nitroso compound, and the maleimide-based crosslinkers. For example, the maleimide-based cross linkers preferably are used. The use of these crosslinkers can enhance the bonding property between the reinforcing fibers and the matrix rubber remarkably.

A commercially available adhesive that contains rubber and a crosslinker may be used as materials for forming the coating layer may include. An example of such adhesive includes Chemlok 402 (manufactured by Lord Corporation).

The total content of the rubber and the crosslinker in the coating layer is 50 wt % or more. The coating layer can be formed by treatment agents (adhesives) of which the main components are rubber and a crosslinker. The term "main components" means the ratio of the content to the composition component (that excludes the solvent) is 50 wt. % or more.

In the reinforcing cord of the present invention, each of the fibers (the reinforcing fibers) may be composed of bundled filaments. In this case, the treatment agent penetrates among the filaments when the above treatment agent is applied. As a result, a composition (including the rubber) that constitutes the coating layer penetrates among the filaments, thereby bonding part or all portions of the filaments.

In the reinforcing cord of the present invention, the coating layer formed on the strand surface may contain a filler. The filler may be organic filler or inorganic filler. Examples of the filler include carbon black and silica. The addition of the filler leads to reduced manufacturing costs of the reinforcing cord for rubber reinforcement, and effective enhancement of the bonding property between the matrix rubber and the reinforcing cord for rubber reinforcement. In particular, the carbon black preferably is used for enhancing the cohesion of the treatment agent (adhesive). The coating layer may contain additives such as plasticizer, antioxidant, metal oxide, and crosslinking coagent, for enhancing the bonding strength or improving the stability.

There is no particular limitation on the thickness of the coating layer or the ratio of the coating layer to the whole cord. These are determined according to the property required for the reinforcing cord, the kinds of reinforcing fibers, or the like. In one example, the ratio of the coating layer to the whole cord is in a range of 1.0 wt. % to 30.0 wt. %.

The reinforcing cord of the present invention may include an underlayer formed between the reinforcing fibers and the coating layer. The underlayer may be formed by a pretreatment agent (hereinafter may be referred to as an "RFL liquid") that contains a resorcinol-formaldehyde condensation product (resorcinol-formalin condensation product) and a rubber latex. The pretreatment with the RFL liquid leads to improvement on the flexibility of the cord, and thus the bending property of the cord is enhanced. The resorcinol-formaldehyde condensation product is not particularly limited. For example, it may be possible to use a resole-type RFL liquid obtained through a reaction between resorcinol and formaldehyde in the presence of alkaline catalysts such as alkaline hydroxide, amine, or the like. A commercially available novolac-type RFL liquid also may be used. The rubber latex is not particularly limited. For example, a butadiene-styrene copolymer latex, a dicarboxylated butadiene-styrene copolymer latex, a vinylpyridine-butadiene-styrene terpolymer latex, a chloroprene latex, a butadiene rubber latex, a chlorosulfonated polyethylene latex, an acrylonitrile-butadiene copolymer latex, and an H-NBR latex can be used. In particular, the H-NBR latex and the chlorosulfonated polyethylene latex preferably are used. The underlayer may be formed of another material.

The reinforcing fibers used in the reinforcing cord of the present invention may be any fiber as long as it can enhance the dimensional stability or the strength of a rubber product. There is no particular limitation on the kinds or the shapes thereof. For example, a glass fiber; a poly(vinyl alcohol) fiber, which is typified by a vinylon fiber; a polyester fiber; polyamide fibers such as nylon and an aramid fiber (aromatic polyamide); a carbon fiber, and a poly(p-phenylenebenzobisoxazole) (PBO) fiber. In particular, it is preferable to use a fiber that is excellent in dimensional stability, tensile strength, and modulus. For example, it is preferable to use at least one fiber selected from the group consisting of glass fiber, aramid fiber, poly(p-phenylene-benzobisoxazole) (PBO) fiber, and carbon fiber.

In one typical example of the reinforcing cord of the present invention, the reinforcing fibers are glass fibers, and the coating layer contains hydrogenated nitrile rubber and a maleimide-based crosslinker. In this case, the underlayer formed of the RFL liquid may be arranged between the glass fibers and the coating layer.

In the reinforcing cord of the present invention, the strand may be primarily twisted. In the reinforcing cord of the present invention, a plurality of strands may be finally twisted. The number of strands is not particularly limited, and may be in a range of 10 to 1200, or equal to or less than that range.

There is no particular limitation on the number of primary twists and that of final twists. Generally, the number is in a range of 0.1 to 8.0 times/25 mm, preferably, in a range of 1.5 to 3.0 times/25 mm. There is no particular limitation on the method of twisting, either. The twisting can be performed by generally used methods by using a flyer twisting frame, a ring twisting frame, or the like. The direction of the primary twist and that of the final twist may be the same or different. When the direction of the primary twist and that of the final twist are the same, the bending fatigue resistance can be improved.

In the reinforcing cord of the present invention, a layer for improving the bonding property with a rubber product may be formed on the surface of the reinforcing cord. In some cases, the above-described coating layer alone does not provide a sufficient bonding property with the matrix rubber of a rubber product. In this case, a second coating layer preferably is formed on the surface of the finally twisted cord for the purposes of enhancing the bonding property with the matrix rubber. Components of the second coating layer may be one that can improve the adhesive bonding with the matrix rubber. For example, a halogen-containing polymer adhesive (Chemlok: manufactured by Lord Corporation, for example), and an adhesive that contains H-NBR rubber and a crosslinker (maleimide-based crosslinker, for example) preferably are used.

Hereinafter, a method of the present invention that is used for manufacturing the reinforcing cord will be described. The reinforcing cord manufactured by the manufacturing method of the present invention configures one example of the reinforcing cord of the present invention. The method of the present invention includes a step (i) for forming strands that include bundled fibers and a coating layer formed so as to cover the bundled fibers.

As described above, the coating layer contains a material for bonding the strands. More specifically, the coating layer contains a material that is crosslinkable by thermal treatment. The step (i) may include a step of forming a coating layer by applying to the bundled fibers a treatment agent that contains the material that is crosslinkable by thermal treatment, and then drying. For example, the step (i) may include a step of forming a coating layer by applying to the bundled fibers a treatment agent that contains rubber (generally, a rubber latex) and a crosslinker, and then drying. The treatment agent contains a solvent and components for forming the coating layer. The coating layer is formed by applying the treatment agent and then removing the solvent.

The above-described substances may be used for the components contained in the treatment agent, that is, the rubber of the rubber latex, the crosslinker, and the filler. The amount of the rubber and the crosslinker contained in the treatment agent is adjusted so that the above-described coating layer is formed. Generally, the treatment agent does not contain a resorcinol-formaldehyde condensation product.

As the solvent, water or an organic solvent may be used. When the coating layer is formed by using an aqueous treatment agent, a treatment agent in which the above-described crosslinker and the latex of the rubber are dissolved or dispersed in water may be used. In order to enhance the bonding strength and improve the stability of the coating layer, plasticizer, antioxidant, metal oxide, crosslinking coagent, filler, or the like may be added to the treatment agent.

The coating layer is formed by applying the treatment agent to the reinforcing fibers, and then drying. The strand can be formed, for example, by a method in which the treatment agent is applied to fibers that are bundled and primarily twisted, and then is dried, or by a method in which fibers are bundled, the treatment agent is applied to the bundled fibers, and then dried, followed by primarily twisting of the resultant bundled fibers. The number of primary twists is as described above.

There is no particular limitation on the methods of applying and drying the treatment agent. Generally, the coating layer is formed by immersing the reinforcing fibers into a bath that contains the treatment agent, and then drying the resultant reinforcing fibers in a drying furnace so that the solvent is removed. There is no particular limitation on the drying condition for removing the solvent, but it is necessary to avoid the drying under a condition that promotes complete progress of a reaction of the crosslinker in the coating layer. Therefore, in the case of drying at relatively high temperatures (80° C. or higher, for example), a drying time preferably is shortened (five minutes or less, for example). For example, in the case of an atmosphere of 150° C. or lower, the drying time may be five minutes or less. In one example, at an atmosphere of 80 to 280° C., the drying time may be 0.1 to 2 minutes.

Next, by twisting the strands together, the strands are brought into tight contact with one another via coating layers (step (ii)). In this stage, the reaction of the crosslinker has not proceeded yet, so that the coating layer is flexible and thus the coating layers are brought into tight contact with one another. In order to bond the strands sufficiently, it is important to form the coating layer on the surface of each strand beforehand. Therefore, when a method in which a plurality of strands composed solely of the reinforcing fibers are bundled, and then the coating layer is formed is employed, it is not possible to bond the strands sufficiently.

The number of twists of the final twist of the strands is as described above. Thus, when the rubber compositions (coating layers) are filled among the fibers, it becomes possible to prevent a gap formation within the strands and among the strands. On the strand surface, the coating layer formed in the step (i) exists. Therefore, the bonding among the strands progresses at the time of the thermal treatment upon the final twist and/or at the time of the thermal treatment after the final twist. The thermal treatment may be performed before the reinforcing cord is embedded in the rubber product, or may be performed after the reinforcing cord is embedded in the rubber product.

The preferred condition of the thermal treatment varies with the material of the coating layer. In order to bond the strands strongly, the thermal treatment is performed at temperatures and for a time period that allow the progress of crosslinking. In one typical example, the thermal treatment is performed at 150° C. for 20 minutes so that the crosslinking is allowed to progress.

The manufacturing method of the present invention may include, prior to the step (i), a step of applying to surfaces of the fibers (reinforcing fibers) a pretreatment agent that contains a resorcinol-formaldehyde condensation product and a rubber latex. As the pretreatment agent, the above-described RFL liquid may be used. Generally, after applying the pretreatment agent, the drying and/or the thermal treatment is performed. The pretreatment leads to the formation of the underlayer. The pretreatment agent is not limited to the RFL liquid, and other pretreatment agents may be used. In one example, the RFL liquid is applied to surfaces of a bundle of the reinforcing fibers, and then dried or thermally treated so that the underlayer is formed. Thereafter, the coating layer that contains rubber and a crosslinker is formed on the underlayer.

Furthermore, the manufacturing method of the present invention may include a step for forming the above-described second coating layer on surfaces of bundled strands. The strands are preferably finally twisted. The second coating layer can be formed by applying and drying an adhesive that serves as a material for the second coating layer.

Embodiment 2

In Embodiment 2, a rubber product of the present invention will be described. The rubber product of the present invention includes a rubber portion and a reinforcing cord for rubber reinforcement embedded in the rubber portion. The reinforcing cord for rubber reinforcement is a reinforcing cord for rubber reinforcement of the present invention.

There is no particular limitation on a means for embedding the reinforcing cord for rubber reinforcement into the matrix rubber of a rubber product, so that a well known means can be applied. When the reinforcing cord for rubber reinforcement of the present invention is simultaneously cured (crosslinked) at the time of curing (at the time of crosslinking) the rubber product, the integrity of the reinforcing cord and the rubber product further can be enhanced, and the cord manufacturing steps can be simplified. The rubber product thus obtained has both the high heat resistance derived from the property of the matrix rubber, and the high strength and the high bending fatigue resistance that are provided by embedding of the reinforcing cord for rubber reinforcement. Accordingly, the rubber product can be applied to various uses. In particular, the rubber product is suitable for the use in a timing belt of vehicle engines, or the like.

In another aspect, the present invention relates to a manufacturing method of a rubber product. In the manufacturing method, the reinforcing cord for rubber reinforcement firstly is manufactured according to the manufacturing method of the present invention. In this case, a thermal treatment that may allow significant progress of the crosslinking of the crosslinker in the coating layer is not performed. Next, the reinforcing cord for rubber reinforcement is embedded in the rubber portion (rubber product) that contains the rubber and the crosslinker. Then, the thermal treatment is performed under the condition that allows sufficient progress of the reaction of the crosslinker (vulcanizing agent), thereby simultaneously crosslinking the rubber of the coating layer of the reinforcing cord for rubber reinforcement, and the rubber of the rubber portion of the rubber product.

One example of the rubber product of the present invention will be described. FIG. 1 shows an exploded perspective view of a toothed belt 10. The toothed belt 10 is provided with a rubber portion 11, and a plurality of cords 12 embedded in the rubber portion 11. The rubber portion 11 is composed of rubber, or rubber and other materials. The cords 12 are reinforcing cords of the present invention, and arranged in parallel to a moving direction of the toothed belt 10. Well known members can be used for portions other than the cords 12.

The rubber product of the present invention is a rubber product reinforced by the reinforcing cord for rubber reinforcement, and may be a timing belt, for example.

EXAMPLES

Hereinafter, the present invention will be described in detail by using Examples.

Example 1

First, a glass fiber in which 200 glass filaments (E-glass composition, average diameter of 9 μm) were bundled was prepared. Three of the glass fibers were aligned with one another, and an aqueous adhesive shown in the following Table 1 was applied. Thereafter, the resultant glass fibers were dried for one minute in a drying furnace whose temperature was set to 150° C. Thus, a strand was formed.

TABLE 1

| Components | Ratios |
| --- | --- |
| H-NBR Latex (with a solid content of 40 wt. %) (*1) | 100 parts by weight |
| Bismaleimide Water Dispersion (with a solid content of 50 wt. %) | 25 parts by weight |
| Carbon Black Water Dispersion (with a solid content of 30 wt. %) | 35 parts by weight |

(*1) Zetpol Latex (manufactured by JAPAN ZEON CORPORATION)

Figure 2:
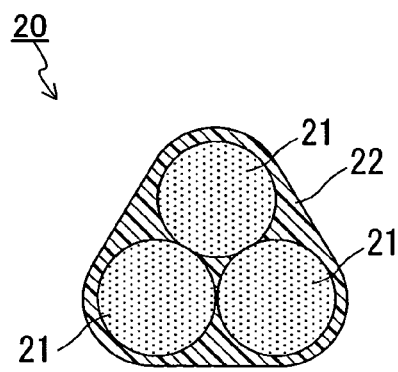
FIG. 2 is a sectional view that schematically shows one example of a strand included in a reinforcing cord for rubber reinforcement of the present invention.

The cross section of a strand 20 that is formed is schematically shown in FIG. 2. Glass fibers 21 are composed of a large number of filaments. A coating layer 22 is formed so as to cover surfaces of a bundle of the three glass fibers 21. The three glass fibers 21 are bonded by the coating layer 22.

The strand thus obtained was primarily twisted at a ratio of 2 times/25 mm. Then, eleven of the primarily twisted strands were aligned with one another, and finally twisted at a ratio of 2 times/25 mm. The ratio of the coating layer to the cord thus obtained was 20 wt. %.

Figure 3:
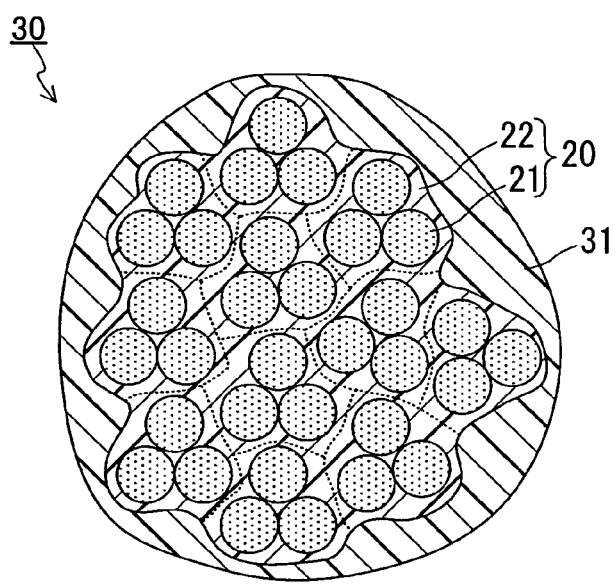
FIG. 3 is a sectional view that schematically shows one example of a reinforcing cord for rubber reinforcement of the present invention.

A second coating layer was formed on the cord for improving the bonding property with the matrix rubber. More specifically, a halogen-containing polymer adhesive (Chemlok 402: manufactured by Lord Corporation) was applied to the cord, and then, dried for one minute in a drying furnace whose temperature was set to 150° C. Thus, a reinforcing cord for rubber reinforcement was obtained. The cross section of a cord 30 that is formed is schematically shown in FIG. 3. A plurality of strands 20 were bonded to one another by the coating layers 22. On the surface of the cord 30, a second coating layer 31 is formed.

Next, the bonding property between the reinforcing cord for rubber reinforcement and the matrix rubber having the composition shown in Table 2 was evaluated. First, two rubber pieces (25 mm in width×50 mm in length×5 mm in thickness) composed of the composition shown in Table 2 were prepared.

TABLE 2

| Components | Ratios |
| --- | --- |
| H-NBR (*2) | 100 parts by weight |
| ZnO | 5 parts by weight |
| Stearic Acid | 1 part by weight |
| Carbon Black | 40 parts by weight |
| Thiokol TP-95 (*3) | 5 parts by weight |
| Sulfur | 0.5 parts by weight |
| Tetramethylthiuramsulfide | 1.5 parts by weight |
| Cyclohexyl-Benzothiazylsulfenamide | 1.0 parts by weight |

(*2) ZETPOL2020 (manufactured by JAPAN ZEON CORPORATION)
(*3) polymer-type polyester plasticizer (manufactured by Toray Industries, Inc.)

Next, the reinforcing cord was sandwiched by the two pieces so that the reinforcing cord was placed in parallel to the longitudinal direction of the rubber pieces, and then, heated at 150° C. for 20 minutes so as to be bonded.

The specimen thus obtained was stretched in the longitudinal direction with a tensile tester so that the peel strength between the matrix rubber and the reinforcing fibers was measured. Furthermore, the fracture surface of the specimen was observed visually, thereby confirming whether it was a "rubber fracture", that is, a fracture that occurred while the reinforcing fibers and the matrix rubber remained to be bonded, or an "interfacial peeling-off", that is, a peeling-off that generated at the interface between the matrix rubber and the reinforcing fibers.

With respect to the reinforcing cord, a test in which the reinforcing cord was bent 10000 times was carried out with a bending tester so that the tensile strengths before and after the test were measured. A bending test further was carried out similar to the above test except that the reinforcing cord was immersed in oil. Then, the ratio of the tensile strength obtained after the bending test to the tensile strength obtained before the bending test, that is, a tensile-strength retention rate, was calculated. The evaluation results are shown in the following Table 5.

Example 2

In Example 2, the reinforcing cord was produced by using the same method as in the case of Example 1 except that the pretreatment was performed on the fiber surface before forming the coating layer. The pretreatment was carried out by applying the RFL liquid (aqueous adhesive) shown in the following Table 3 to three glass fibers aligned with one another (the same glass fibers as in Example 1), and then performing the thermal treatment at 240° C. for 2.5 minutes.

TABLE 3

| Components | Ratios |
| --- | --- |
| RFL Liquid (with a solid content of 8 wt. %) (The molar ratio of resorcinol/formaldehyde is 1/1.5) | 30 parts by weight |

TABLE 3-continued

| Components | Ratios |
| --- | --- |
| Vinylpyridine-Butadiene-Styrene Terpolymer Latex (with a solid content of 40 wt. %) | 45 parts by weight |
| Chlorosulfonated-Polyethylene Latex (with a solid content of 40 wt. %) | 20 parts by weight |
| 25% Ammonia Solution | 1 part by weight |
| Water | 4 parts by weight |

The reinforcing cord produced in Example 2 also was evaluated for the bonding property and the flexibility in bending by using the same method as in the case of Example 1. The evaluation results are shown in the following Table 5.

Example 3

The reinforcing cord was produced by using the same method as in the case of Example 2 except that the treatment agent was changed and the second coating layer was not formed. In Example 3, a halogen-containing polymer adhesive (Chemlok 402 (manufactured by Lord Corporation)) was used as the treatment agent.

The reinforcing cord produced in Example 3 also was evaluated for the bonding property and the flexibility in bending by using the same method as in the case of Example 1. The evaluation results are shown in the following Table 5.

Comparative Example 1

The reinforcing cord was produced by using the same method as in the case of Example 1 except that the treatment agent for forming the coating layer and the drying condition of the treatment agent were changed. In Comparative Example 1, the treatment agent (RFL liquid) whose components are shown in Table 4 was applied to the glass fibers, and then the resultant glass fibers were thermally treated at 230° C. Thus, the coating layer (underlayer) was formed.

TABLE 4

| Components | Ratios |
| --- | --- |
| H-NBR Latex (with a solid content of 40 wt. %) | 65 parts by weight |
| Resorcinol-Formaldehyde Condensation Product (with a solid content of 8 wt. %) (The molar ratio of resorcinol/formaldehyde is 1/1.3) | 30 parts by weight |
| 25% Ammonia Aqueous Solution | 1 part by weight |
| Water | 4 parts by weight |

The reinforcing cord produced in Comparative Example 1 also was evaluated for the bonding property and the flexibility in bending by using the same method as in the case of Example 1. The evaluation results are shown in the following Table 5.

TABLE 5

| | Ex. 1 | Ex. 2 | Ex. 3 | C. Ex. 1 |
| --- | --- | --- | --- | --- |
| Pretreatment | NO | RFL liquid | RFL liquid | RFL liquid |
| Bonding treatment between strands | YES (Aqueous) | YES (Aqueous) | YES (Organic solvent-based) | NO |
| Second coating layer | YES (Organic solvent-based) | YES (Organic solvent-based) | NO | YES (Organic solvent-based) |

TABLE 5-continued

|  | Ex. 1 | Ex. 2 | Ex. 3 | C. Ex. 1 |
| --- | --- | --- | --- | --- |
| Peeling strength (N/10 mm) | 150 | 150 | 150 | 150 |
| Fracture manner | Rubber fracture | Rubber fracture | Rubber fracture | Rubber fracture |
| Tensile-strength retention rate after bending test (%) | 90 | 100 | 95 | 60 |
| Tensile-strength retention rate after bending test with being immersed in oil (%) | 91 | 85 | 80 | 30 |

As Table 5 shows, in the cords in Examples 1 to 3 where the strands are bonded, high flexibility in bending was exhibited. In the cords in Examples 1 to 3, high flexibility in bending was exhibited also in the case of the oil impregnation. Furthermore, in the cords in Examples 2 and 3 where the pretreatment was performed before forming the coating layer, the flexibility in bending was particularly high at a normal state.

INDUSTRIAL APPLICABILITY

The present invention can be applied to various rubber products and a reinforcing cord for rubber reinforcement used therefor. In particular, the present invention is preferably used for a timing belt of vehicle engines, or the like, that require high flexibility in bending and reliability.

The invention claimed is:

1. A reinforcing cord for rubber reinforcement for reinforcing a rubber product, comprising a plurality of strands, wherein
the strand comprises bundled fibers and a coating layer formed directly on the bundled fibers so that the coating layer covers a surface of the bundled fibers and is present between fibers of the bundled fibers,
the plurality of the strands are in tight contact with one another via the coating layer,
the coating layer contains rubber and a crosslinker,
the rubber contained in the coating layer is hydrogenated nitrile rubber,
the crosslinker is a maleimide-based crosslinker, and
the coating layer does not contain a resorcinol-formaldehyde condensation product.

2. The reinforcing cord for rubber reinforcement according to claim 1, wherein
each of the bundled fibers comprises bundled filaments, and
the rubber contained in the coating layer penetrates among the filaments.

3. The reinforcing cord for rubber reinforcement according to claim 1, wherein the fiber is at least one selected from the group consisting of a glass fiber, an aramid fiber, a poly(p-phenylene-benzobisoxazole) fiber and a carbon fiber.

4. The reinforcing cord for rubber reinforcement according to claim 1, further comprising a layer, which improves bonding property of the reinforcing cord for rubber reinforcement with the rubber product, on a surface of the reinforcing cord for rubber reinforcement of claim 1,
wherein the layer formed on the surface of the reinforcing cord of claim 1 is formed on the plurality of the strands, in which the coating layer covers the surface of the bundled fibers and is present between the fibers of the bundled fibers.

5. A rubber product, comprising a rubber portion and a reinforcing cord for rubber reinforcement embedded in the rubber portion, wherein
the reinforcing cord for rubber reinforcement is the reinforcing cord for rubber reinforcement according to claim 1.

6. A manufacturing method of a reinforcing cord for rubber reinforcement, comprising the steps of:
(i) forming strands that include bundled fibers and a coating layer formed directly on the bundled fibers so that the coating layer covers a surface of the bundled fibers and is present between fibers in the bundled fibers; and
(ii) bringing a plurality of the strands into tight contact with one another via the coating layer by twisting the strands together, wherein
the coating layer contains rubber and a crossliker,
the rubber contained in the coating layer is hydrogenated nitrile rubber,
the crosslinker is a maleimide-based crosslinker, and
the coating layer does not contain a resorcinol-formaldehyde condensation product.

7. The method of manufacturing a reinforcing cord for rubber reinforcement according to claim 6, wherein
the step (i) includes a step of forming the coating layer by applying to the bundled fibers an agent that contains a rubber latex and a crosslinker, and then drying.

8. The reinforcing cord for rubber reinforcement according to claim 1, wherein the plurality of strands are bonded via the coating layer.

9. The reinforcing cord for rubber reinforcement according to claim 1, wherein the fibers of the bundled fibers are glass fibers.

10. The reinforcing cord for rubber reinforcement according to claim 1, wherein the plurality of strands are held in tight contact with one another by a layer of the coating layer alone.

* * * * *

UNITED STATES PATENT AND TRADEMARK OFFICE
CERTIFICATE OF CORRECTION

PATENT NO. : 9,593,445 B2  Page 1 of 1
APPLICATION NO. : 11/629397
DATED : March 14, 2017
INVENTOR(S) : Akiyama et al.

It is certified that error appears in the above-identified patent and that said Letters Patent is hereby corrected as shown below:

On the Title Page

Page 2, Item (56), Column 2, under "Foreign Patent Documents", Line 10, delete "JP    03/000611 1/2003".

In the Claims

Column 12, in Claim 6, Line 38, delete "crossliker," and insert -- crosslinker, --.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*